United States Patent
Zivic (10) Patent No.: US 10,944,720 B2
(45) Date of Patent: Mar. 9, 2021

(54) METHODS AND SYSTEMS FOR NETWORK SECURITY

(71) Applicant: Pensando Systems Inc., Milpitas, CA (US)

(72) Inventor: Predrag Zivic, Milpitas, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 16/641,489

(22) PCT Filed: Aug. 23, 2018

(86) PCT No.: PCT/US2018/047787
§ 371 (c)(1),
(2) Date: Feb. 24, 2020

(87) PCT Pub. No.: WO2019/040771
PCT Pub. Date: Feb. 28, 2019

(65) Prior Publication Data
US 2020/0389433 A1   Dec. 10, 2020

Related U.S. Application Data

(60) Provisional application No. 62/549,785, filed on Aug. 24, 2017.

(51) Int. Cl.
*H04L 29/06* (2006.01)
*H04L 12/24* (2006.01)
(Continued)

(52) U.S. Cl.
CPC ...... *H04L 63/0236* (2013.01); *G06F 9/45558* (2013.01); *H04L 41/069* (2013.01);
(Continued)

(58) Field of Classification Search
CPC .............. H04L 63/0236; H04L 41/069; H04L 63/1416; H04L 63/1425; G06F 9/45558
See application file for complete search history.

(56) References Cited

U.S. PATENT DOCUMENTS 8,621,627 B1   12/2013   Eiriksson et al.
8,925,101 B2 *  12/2014   Bhargava .............. G06F 21/604
                                                    726/27
(Continued)

FOREIGN PATENT DOCUMENTS

WO   WO-2005116796 A1   12/2005
WO   WO-2019040771 A1   2/2019

OTHER PUBLICATIONS

PCT/US2018/047787 International Search Report and Written Opinion dated Nov. 26, 2018.

*Primary Examiner* — Oleg Korsak
(74) *Attorney, Agent, or Firm* — Wilson Sonsini Goodrich & Rosati (57) ABSTRACT

Described are devices, systems, and methods for improving network security by providing network interface devices communicatively coupled to end-point-protection platforms (EPP) based on integration of two different technologies (e.g., smart NICs and EPP software) allowing each to automatically signal the other and implement automated protection mechanisms to isolate or protect a host, a virtual machine, and/or a container.

49 Claims, 2 Drawing Sheets

(51) Int. Cl.
  *G06F 9/455* (2018.01)
  *G06F 13/42* (2006.01)
(52) U.S. Cl.
  CPC ...... *H04L 63/1416* (2013.01); *H04L 63/1425* (2013.01); *G06F 13/4221* (2013.01); *G06F 2009/45595* (2013.01)

(56) References Cited

U.S. PATENT DOCUMENTS

| | | | |
|---|---|---|---|
| 8,938,800 B2* | 1/2015 | Bhargava | H04L 63/1416 726/22 |
| 9,438,634 B1* | 9/2016 | Ross | H04L 63/20 |
| 10,075,459 B1* | 9/2018 | Suryanarayanan | H04L 63/0227 |
| 10,108,446 B1* | 10/2018 | Steinberg | G06F 9/44521 |
| 10,701,104 B2* | 6/2020 | Malkov | G06F 9/45558 |
| 2005/0138402 A1 | 6/2005 | Yoon et al. | |
| 2009/0254990 A1 | 10/2009 | McGee | |
| 2012/0124093 A1 | 5/2012 | Akyol et al. | |
| 2012/0222114 A1 | 8/2012 | Shanbhogue et al. | |
| 2012/0266230 A1 | 10/2012 | Vanderpol et al. | |
| 2012/0297057 A1* | 11/2012 | Ghosh | H04L 63/1441 709/224 |
| 2013/0305371 A1 | 11/2013 | Figlin et al. | |
| 2016/0036837 A1* | 2/2016 | Jain | H04L 63/1416 726/23 |
| 2016/0378529 A1 | 12/2016 | Wen et al. | |
| 2017/0171159 A1* | 6/2017 | Kumar | H04L 63/0281 |

* cited by examiner

METHODS AND SYSTEMS FOR NETWORK SECURITY

CROSS-REFERENCE TO RELATED APPLICATIONS

This application is the national stage entry of International Application No. PCT/US2018/047787, filed on Aug. 23, 2018, which claims the priority and benefit of U.S. Provisional Application No. 62/549,785 filed on Aug. 24, 2017, entitled, "METHODS AND SYSTEMS FOR NETWORK SECURITY," the entire contents of each are incorporated herein by reference for all purposes.

BACKGROUND OF THE INVENTION

A network interface controller (NIC) is a computer hardware component that connects a computer to a computer network. Once connected to a network, an end-point-protection platform (EPP) is often employed to enable the securing of end-point devices. An EPP may involve antivirus, antispyware, intrusion detection/prevention, a personal firewall, and other end-point protection solutions.

SUMMARY OF THE INVENTION

Using current technologies, it is very difficult to isolate a host, a virtual machine, and/or a container that is exhibiting signs of a security problem, such as a malware infection from rest of a network. Isolation is usually manual process and often requires physically disconnecting the host from the network. EPPs can detect security and network problems on the host, virtual machine, or container. Moreover, current end-point-protection platforms do not communicate security-related signals to directly to network interface devices, such as smart NICs. Conversely, existing network interface devices are not configured to communicate security-related signals directly to end-point-protection platforms.

In sharp contrast, the devices, systems, and methods described herein employ signaling between smart NICs and EPPs to exchange security- and network-related events to increase security of the network. The devices, systems, and methods described herein are based on integration of two different technologies (e.g., smart NICs and EPP software) allowing each to automatically signal the other and implement automated protection mechanisms to isolate or protect a host, a virtual machine, and/or a container. The devices, systems, and methods described herein are optionally used to implement automated security platforms on a bare metal server, a virtual machine, or a container. For example, once an EPP detects an issue, an automated signal is sent to a smart NIC to take appropriate action. Also, if a smart NIC detects any network problems or network security-related events it automatically signals an EPP to conduct an appropriate protection action on the host.

Accordingly, in one aspect, disclosed herein are network interface devices, such as smart NICs, communicatively coupled to an end-point-protection platforms (EPPs), the network interface device comprising: a memory for storing a first set of instructions and one or more processors configured to execute the first set of instructions to: receive, from the EPP, a report message comprising information about a detected security threat, a security state of a base system logic or a security configuration, wherein the EPP is hosted on the base system logic; and instruct, in response to the report message, the network interface device to perform one or more actions comprising at least one of the following: suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service. In some embodiments, the network interface device is further configured to: monitor, control, or both monitor and control network traffic activity; generate an alert comprising information about a threat detected by the network interface device; and forward the alert to the EPP. In further embodiments, the network interface device detects the threat by filtering the network traffic. In other embodiments, the network interface device detects the threat by comparing a traffic pattern to an expected traffic pattern. In yet other embodiments, the network interface device detects the threat by identifying a malware, a virus, a trojan, an embedded macro, an unpermitted application access, an unauthorized username for authentication, or an attempt to initiate a new service or application access. In some embodiments, the network interface device is coupled to the base system logic via an I/O bus or a virtual port of an I/O bus. In other embodiments, the network interface device is coupled to the base system logic via internal connection or a virtual network connection. In some embodiments, the EPP comprises a plurality of security function modules. In further embodiments, the plurality of security function modules comprise a firewall. In further embodiments, the plurality of security function modules comprise a module determining the security state of the base system logic. In still further embodiments, the security state of the base system logic is determined based at least in part on detection of diminished system performance, detection of explicit evidence of malware, or both diminished system performance and detection of explicit evidence of malware. In yet further embodiments, the plurality of security function modules comprise a module generating and forwarding the report message to the network interface device. In some embodiments, the base system logic comprises a memory for storing a second set of instructions and one or more processors configured to execute the second set of instructions to generate the report message. In some embodiments, the base system logic comprises one or more virtual machines or containers. In further embodiments, the base system logic comprises a hypervisor or a docker base for controlling the one or more virtual machines or containers and wherein the hypervisor or the docker base is coupled to the network interface device. In still further embodiments, the hypervisor or the docker base is hosted on the base system logic. In other embodiments, the hypervisor or docker base is a component of the network interface device. In some embodiments, the security configuration comprises one or more instructions to the network interface device. In further embodiments, the one or more instructions comprise an instruction to direct the network interface device to perform an action selected from the one or more actions. In some embodiments, the report message is analyzed to generate one or more control instructions to the network interface device. In further embodiments, the one or more control instructions comprise an instruction to activate or deactivate the network interface device, and wherein the control instruction is generated based on the security state of the base system logic provided by the report message. In further embodiments, the one or more control instructions comprise an instruction to suspend network traffic associated with the detected security threat, and wherein the control instruction is generated based on address identified from the detected security threat. In further embodiments, the one or more control instructions comprise an instruction to redirect network traffic associated with the detected security threat to the destination address and destination port based on the predetermined deception based technology, and wherein control instruction is generated according to the detected security threat and the security configuration provided by the report message. In further embodiments, the one or more control instructions comprise an instruction to send a beacon message to the network informing the security state of the base system logic and wherein the control instruction is generated when the security state of the base system logic is determined to be below a predetermined threshold. In still further embodiments, the threshold is determined by the network interface device. In other embodiments, the threshold is determined by the EPP.

In another aspect, disclosed herein are methods for providing network security, comprising: receiving, at a network interface device (such as a smart NIC), a report message generated by an end-point-protection platform (EPP) that is configured to monitor network traffic activity or security state of a base system logic hosting the EPP, wherein the report message comprises information about a detected security threat, the security state of the base system logic or a security configuration, and wherein the report message is transmitted via an internal connection; and performing, by the network interface device, one or more actions in response to the report message, wherein the one or more actions comprising at least one of the following: suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service. In some embodiments, the method further comprises: monitoring, controlling, or monitoring and controlling, by the network interface device, network traffic activity; generating, by the network interface device, an alert comprising information about a threat detected by the network interface device; and forwarding, by the network interface device, the alert to the EPP. In some embodiments, the threat is detected by filtering the network traffic. In other embodiments, the threat is detected by comparing a traffic pattern to an expected traffic pattern. In yet other embodiments, the threat is detected by identifying a malware, a virus, a trojan, an embedded macro, an unpermitted application access, an unauthorized username for authentication, or an attempt to initiate a new service or application access. In some embodiments, the EPP comprises a plurality of security function modules. In further embodiments, the plurality of security function modules comprise a firewall. In further embodiments, the plurality of security function modules comprise a module determining the security state of the base system logic. In still further embodiments, the security state of the base system logic is determined based at least in part on detection of diminished system performance, detection of explicit evidence of malware, or both diminished system performance and detection of explicit evidence of malware. In some embodiments, the plurality of security function modules comprise a module generating and forwarding the report message to the network interface device. In some embodiments, the base system logic comprises a memory for storing a second set of instructions and one or more processors configured to execute the second set of instructions to generate the report message. In some embodiments, the base system logic comprise one or more virtual machines or containers. In further embodiments, the base system logic comprises a hypervisor or a docker base for controlling the one or more virtual machines or containers and wherein the hypervisor or the docker base is coupled to the network interface device. In some embodiments, the security configuration comprises one or more instructions to the network interface device. In further embodiments, the one or more instructions comprise an instruction to direct the network interface device to perform an action selected from the one or more actions. In some embodiments, the report message is analyzed to generate one or more control instructions to the network interface device. In further embodiments, the one or more control instructions comprise an instruction to activate or deactivate the network interface device, and wherein the control instruction is generated based on the security state of the base system logic provided by the report message. In further embodiments, the one or more control instructions comprise an instruction to suspend network traffic associated with the detected security threat, and wherein the control instruction is generated based on address identified from the detected security threat. In further embodiments, the one or more control instructions comprise an instruction to redirect network traffic associated with the detected security threat to the destination address and destination port based on the predetermined deception based technology, and wherein control instruction is generated according to the detected security threat and the security configuration provided by the report message. In further embodiments, the one or more control instructions comprise an instruction to send a beacon message to the network informing the security state of the base system logic and wherein the control instruction is generated when the security state of the base system logic is determined to be below a predetermined threshold. In still further embodiments, the threshold is determined by the network interface device. In other embodiments, the threshold is determined by the EPP.

In yet another aspect, disclosed herein are computing systems comprising: an end-point-protection platform (EPP) and a network interface device; the EPP hosted on a base system logic of the computing system and in communication with the network interface device; the EPP configured to: detect a security threat; generate a report message comprising information about a detected security threat, a security state of a base system logic, or a security configuration; and transmit the report message to the network interface device; the network interface device a smart network interface device comprising: a memory for storing a first set of instructions and one or more processors configured to execute the first set of instructions to: receive the report message from the EPP; perform, in response to the report message, one or more of: suspending network traffic associated with the detected security threat, isolating the base system logic from the network; redirecting a network traffic associated with the detected threat to a destination address and destination port based on a predetermined deception based technology; sending a beacon message to the network related to the security state of the base system logic; preventing base system communication with an internet host; and suspending an application, a user, or a service.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION OF THE INVENTION

The devices, systems, and methods described herein are based on integration of two different technologies (e.g., smart NICs and EPP software) allowing each to automatically signal the other and implement automated protection mechanisms to isolate or protect a host, a virtual machine, and/or a container. The devices, systems, and methods described herein are optionally used to implement automated security platforms on a bare metal server, a virtual machine, or a container. For example, once an EPP detects an issue, an automated signal is sent to a smart NIC to take appropriate action. Also, if a smart NIC detects any network problems or network security-related events it automatically signals an EPP to conduct an appropriate protection action on the host.

Described herein, in certain embodiments, are disclosed herein are network interface devices communicatively coupled to end-point-protection platforms (EPPs), the network interface device comprising: a memory for storing a first set of instructions and one or more processors configured to execute the first set of instructions to: receive, from the EPP, a report message comprising information about a detected security threat, a security state of a base system logic or a security configuration, wherein the EPP is hosted on the base system logic; and instruct, in response to the report message, the network interface device to perform one or more actions comprising at least one of the following: suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service.

Also described herein, in certain embodiments, are methods for providing network security, comprising: receiving, at a network interface device, a report message generated by an end-point-protection platform (EPP) that is configured to monitor network traffic activity or security state of a base system logic hosting the EPP, wherein the report message comprises information about a detected security threat, the security state of the base system logic or a security configuration, and wherein the report message is transmitted via an internal connection; and performing, by the network interface device, one or more actions in response to the report message, wherein the one or more actions comprising at least one of the following: suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service.

Also described herein, in certain embodiments, are computing systems comprising: an end-point-protection platform (EPP) and a network interface device; the EPP hosted on a base system logic of the computing system and in communication with the network interface device; the EPP configured to: detect a security threat; generate a report message comprising information about a detected security threat, a security state of a base system logic, or a security configuration; and transmit the report message to the network interface device; the network interface device a smart network interface device comprising: a memory for storing a first set of instructions and one or more processors configured to execute the first set of instructions to: receive the report message from the EPP; perform, in response to the report message, one or more of: suspending network traffic associated with the detected security threat, isolating the base system logic from the network; redirecting a network traffic associated with the detected threat to a destination address and destination port based on a predetermined deception based technology; sending a beacon message to the network related to the security state of the base system logic; preventing base system communication with an internet host; and suspending an application, a user, or a service

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

End-Point-Protection Platform (EPP)

In some embodiments, the platforms, systems, media, and methods described herein include an EPP, or use of the same. In some embodiments, the EPP is hosted on the base system logic. Suitable EPP software includes anti-virus (AV) 101 and anti-malware (AM) software integrated to signal to a smart NIC. Many EPPs are suitable including, by way of non-limiting examples, X Palo Alto Networks Traps 103, Cylance, CarbonBlack, CrowdStrike, Symantec AV, Sophos, Trend-Micro, Kaspersky, and others. In some embodiments, the EPP is configured to generate and send report messages to a smart NIC, wherein a report message optionally comprises information about a detected security threat, a security state of a base system logic, and/or a security configuration.

In some embodiments, the EPP comprises one or more security function modules. In further embodiments, at least one of the security function modules comprises a firewall. In still further embodiments, at least one of the security function modules comprises a module determining the security state of the base system logic.

Network Interface Device

In some embodiments, the devices, systems, and methods described herein include a network interface device, or use of the same. In some embodiments, the network interface device is a network interface controller (NIC) 110. In further embodiments, the NIC is a smart NIC comprising: a memory and one or more processors configured to execute instructions.

The NIC is coupled to an EPP. In some embodiments, the NIC is communicatively coupled to the EPP such that they exchange security-related signals. In a particular embodiment, the NIC is communicatively coupled to the EPP through API integration. In some embodiments, the NIC is coupled to the base system logic via an I/O bus or a virtual port of an I/O bus to communicate with the EPP software.

In some embodiments, the NIC is configured to receive report messages from an EPP. In further embodiments, a report message optionally comprises information about a detected security threat, a security state of a base system logic, and/or a security configuration. In further embodiments, the NIC is configured to perform actions in response to receiving a report message from an EPP. By way of non-limiting examples, suitable actions include suspending network traffic associated with the detected security threat, isolating the base system logic from the network, redirecting network traffic associated with the detected security threat to a destination address and destination port based on a predetermined deception based technology, sending a beacon message to the network related to the security state of the base system logic, preventing the base system communication with an internet host, and suspending an application, a user, or a service.

In some embodiments, the NIC is configured to generate an alert 111 comprising information about a threat detected by the NIC and forward the alert to the EPP software. In various embodiments, the NIC optionally detects a security threat by filtering the network traffic, comparing a network traffic pattern to an expected traffic pattern, and/or identifying a malware, a virus, a trojan, an embedded macro, an unpermitted application access, an unauthorized username for authentication, or an attempt to initiate a new service or application access. In some embodiments, the NIC is configured to monitor and/or control network traffic activity.

Signaling

The devices, systems, and methods described herein provide API or driver integration to exchange signals between EPP software and smart NIC devices on bare-metal and virtualized servers. Automated signaling implementation requires integration between an EPP API or driver/library integration with a smart NIC API or driver/library. In some embodiments, the signals are transmitted via an internal connection between EPP software and a smart NIC device. This integration is optionally used to block, alert, and/or send related configuration information to secure a host, a virtual machine (VM), and/or a container. The list of signaling actions of integration of API or driver/libraries optionally includes, but is not limited to, the following actions: block and/or alert on all traffic and isolate host or VM from the network; block and/or alert on only malware traffic from the host or VM; block and/or alert on malware lateral movement on the network; and send specific security configuration to secure the host, virtual machine or container.

The automated signaling between two components (e.g., a smart NIC and EPP software) effectively creates increased security and protection for a host, a virtual machine, and/or a container.

Figure 1:
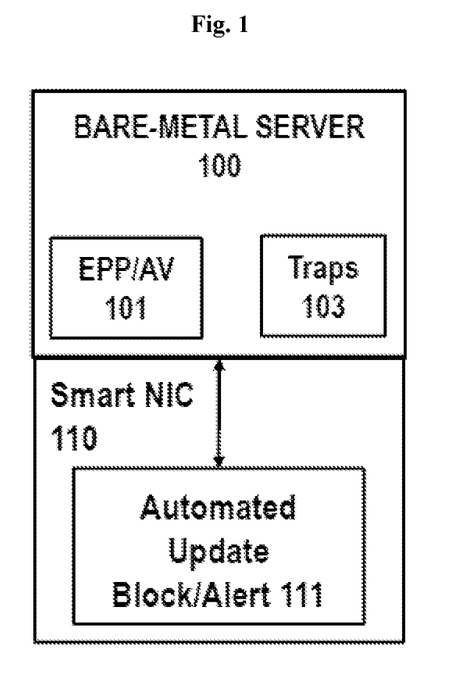
FIG. 1 shows a non-limiting schematic diagram of a bare-metal server implementation.

FIG. 1 shows a non-limiting schematic diagram of a bare-metal server 100 implementation. As shown in the drawing, one or more EPP software is hosted on the base system logic of the server. The present invention may, however, be implemented in other types of computer system configurations that may be utilized as thin servers or server appliances and management servers. As shown, the base system loci may be a computer system that has a processor (CPU), a read-only memory (ROM), and a read-write Random-Access Memory (RAM) connected to a processor bus. Optionally, computer system also includes additional CPUs. The CPU, ROM, and RAM may be also coupled to Input/Output (I/O) bus of computer system through I/O host bridge. I/O host bridge provides a low latency path through which processor may directly access I/O devices mapped anywhere within bus memory or I/O address spaces. I/O host bridge also provides a high bandwidth path for allowing I/O devices to directly access RAM.

A network interface card (or logic) may also be attached to the I/O bus. The network interface card may be of a programmable form and provides the function and hardware to connect computer system to a network. The network interface card may be connected to the base system logic via I/O busses to enable a direct communication. The direction communication may be one-way communication to two-way communication.

Reporting messages may be transmitted via the direct communication. The reporting message generated by the EPP software upon detection a security threat may comprise information about a detected security threat, a security state of a base system logic, or a security configuration. In some cases, the security state of the base system logic is determined based at least in part on detection of diminished system performance, detection of explicit evidence of malware, or both diminished system performance and detection of explicit evidence of malware. In some cases, the security configuration comprises one or more instructions to the network interface device. For example, the one or more instructions comprise an instruction to direct the network interface device to perform an action selected from the one or more actions. In another example, the one or more control instructions comprise an instruction to activate or deactivate the network interface device, and wherein the control instruction is generated based on the security state of the base system logic provided by the report message. In another example, the one or more control instructions comprise an instruction to suspend network traffic associated with the detected security threat, and wherein the control instruction is generated based on address identified from the detected security threat. In another example, the one or more control instructions comprise an instruction to redirect network traffic associated with the detected security threat to the destination address and destination port based on the predetermined deception based technology, and wherein control instruction is generated according to the detected security threat and the security configuration provided by the report message. In a further example, the one or more control instructions comprise an instruction to send a beacon message to the network informing the security state of the base system logic and wherein the control instruction is generated when the security state of the base system logic is determined to be below a predetermined threshold. Alternatively, the one or more control instructions may be generated by the network interface card response to receiving the reporting message.

The EPP software may forward the reporting message to the network interface card via the direct communication. In response to receipt of the reporting message, the network interface card may perform one or more actions such as suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service. For example, one or more security policies, rules or blacklist of the network interface card may be updated according to the reporting message.

The reporting message generated by the network interface card upon detection of a network threat or condition may comprise: an identified malware, a virus, a trojan, an embedded macro, an unpermitted application access, an unauthorized username for authentication, or an attempt to initiate a new service or application access. In some cases, the network threat or condition may be detected by filtering the network traffic or by comparing a traffic pattern to an expected traffic pattern.

The network interface card may forward the reporting message to the EPP software via the direct communication. Upon receiving the reporting message, the EPP software may perform one or more actions such as updating one or more security policies, firewall rules/settings or blacklist according to the reporting message.

Figure 2:
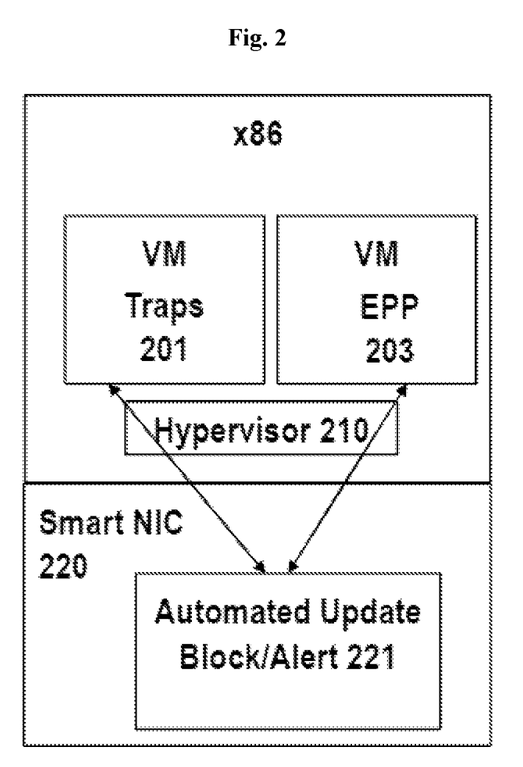
FIG. 2 shows a non-limiting schematic diagram of a virtualized server implementation.

FIG. 2 shows a non-limiting schematic diagram of a virtualized server implementation. The EPP software 203 may be hosted on a virtual machine or a container. The base system logic may comprise a hypervisor 210 or docker base for controlling one or more virtual machines or containers. Execution of a software container can be the same regardless of the underlying infrastructure. A docker is one of the existing platforms for creating, migrating, managing, and deploying software containers. A network interface card 220 may be in direction communication with the EPP 203 or Traps 201 through the hypervisor 210 or docker via virtual port of an I/O bus. The direction communication may enable reporting messages 221 generated by the EPP then forwarded to the network interface card and vice versa. The reporting messages and subsequent actions are similar as described in FIG. 1.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A network interface device coupled to an end-point-protection platform (EPP), the network interface device comprising: a memory for storing a first set of instructions and one or more processors configured to execute the first set of instructions to:
  a) receive, from the EPP, a report message comprising information about a detected security threat, a security state of a base system logic, or a security configuration, wherein the EPP is hosted on the base system logic; and
  b) instruct, in response to the report message, the network interface device to perform one or more actions comprising at least one of the following: suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service.

2. The network interface device of claim 1, wherein the network interface device is further configured to:
  a) monitor, control, or both monitor and control network traffic activity;
  b) generate an alert comprising information about a threat detected by the network interface device; and
  c) forward the alert to the EPP.

3. The network interface device of claim 2, wherein the network interface device detects the threat by filtering the network traffic.

4. The network interface device of claim 2, wherein the network interface device detects the threat by comparing a traffic pattern to an expected traffic pattern.

5. The network interface device of claim 2, wherein the network interface device detects the threat by identifying a malware, a virus, a trojan, an embedded macro, an unpermitted application access, an unauthorized username for authentication, or an attempt to initiate a new service or application access.

6. The network interface device of claim 1, wherein the network interface device is coupled to the base system logic via an I/O bus or a virtual port of an I/O bus.

7. The network interface device of claim 1, wherein the network interface device is coupled to the base system logic via internal connection or a virtual network connection.

8. The network interface device of claim 1, wherein the EPP comprises a plurality of security function modules.

9. The network interface device of claim 8, wherein the plurality of security function modules comprise a firewall.

10. The network interface device of claim 8, wherein the plurality of security function modules comprise a module determining the security state of the base system logic.

11. The network interface device of claim 10, wherein the security state of the base system logic is determined based at least in part on detection of diminished system performance, detection of explicit evidence of malware, or both diminished system performance and detection of explicit evidence of malware.

12. The network interface device of claim 8, wherein the plurality of security function modules comprise a module generating and forwarding the report message to the network interface device.

13. The network interface device of claim 1, wherein the base system logic comprises a memory for storing a second set of instructions and one or more processors configured to execute the second set of instructions to generate the report message.

14. The network interface device of claim 1, wherein the base system logic comprise one or more virtual machines or containers.

15. The network interface device of claim 14, wherein the base system logic comprises a hypervisor or a docker base for controlling the one or more virtual machines or containers and wherein the hypervisor or the docker base is coupled to the network interface device.

16. The network interface device of claim 15, wherein the hypervisor or the docker base is hosted on the base system logic.

17. The network interface device of claim 15, wherein the hypervisor or docker base is a component of the network interface device.

18. The network interface device of claim 1, wherein the security configuration comprises one or more instructions to the network interface device.

19. The network interface device of claim 18, wherein the one or more instructions comprise an instruction to direct the network interface device to perform an action selected from the one or more actions.

20. The network interface device of claim 1, wherein the report message is analyzed to generate one or more control instructions to the network interface device.

21. The network interface device of claim 20, wherein the one or more control instructions comprise an instruction to activate or deactivate the network interface device, and wherein the control instruction is generated based on the security state of the base system logic provided by the report message.

22. The network interface device of claim 20, wherein the one or more control instructions comprise an instruction to suspend network traffic associated with the detected security threat, and wherein the control instruction is generated based on address identified from the detected security threat.

23. The network interface device of claim 20, wherein the one or more control instructions comprise an instruction to redirect network traffic associated with the detected security threat to the destination address and destination port based on the predetermined deception based technology, and wherein control instruction is generated according to the detected security threat and the security configuration provided by the report message.

24. The network interface device of claim 20, wherein the one or more control instructions comprise an instruction to send a beacon message to the network informing the security state of the base system logic and wherein the control instruction is generated when the security state of the base system logic is determined to be below a predetermined threshold.

25. The network interface device of claim 24, wherein the threshold is determined by the network interface device.

26. The network interface device of claim 24, wherein the threshold is determined by the EPP.

27. A method for providing network security, comprising:
a) receiving, at a network interface device, a report message generated by an end-point-protection platform (EPP) that is configured to monitor network traffic activity or security state of a base system logic hosting the EPP, wherein the report message comprises information about a detected security threat, the security state of the base system logic, or a security configuration, and wherein the report message is transmitted via an internal connection; and
b) performing, by the network interface device, one or more actions in response to the report message, wherein the one or more actions comprising at least one of the following: suspending network traffic associated with the detected security threat, isolating the base system logic from the network, redirecting a network traffic associated with the detected security threat to a destination address and destination port based on a predetermined deception based technology, sending a beacon message to the network related to the security state of the base system logic, preventing the base system communication with an internet host, or suspending an application, a user name or a service.

28. The method of claim 27, further comprising:
a) monitoring, controlling, or monitoring and controlling, by the network interface device, network traffic activity;
b) generating, by the network interface device, an alert comprising information about a threat detected by the network interface device; and
c) forwarding, by the network interface device, the alert to the EPP.

29. The method of claim 28, wherein the threat is detected by filtering the network traffic.

30. The method of claim 28, wherein the threat is detected by comparing a traffic pattern to an expected traffic pattern.

31. The method of claim 28, wherein the threat is detected by identifying a malware, a virus, a trojan, an embedded macro, an unpermitted application access, an unauthorized username for authentication, or an attempt to initiate a new service or application access.

32. The method of claim 28, wherein the EPP comprises a plurality of security function modules.

33. The method of claim 32, wherein the plurality of security function modules comprise a firewall.

34. The method of claim 32, wherein the plurality of security function modules comprise a module determining the security state of the base system logic.

35. The method of claim 33, wherein the security state of the base system logic is determined based at least in part on detection of diminished system performance, detection of explicit evidence of malware, or both diminished system performance and detection of explicit evidence of malware.

36. The method of claim 32, wherein the plurality of security function modules comprise a module generating and forwarding the report message to the network interface device.

37. The method of claim 28, wherein the base system logic comprises a memory for storing a second set of instructions and one or more processors configured to execute the second set of instructions to generate the report message.

38. The method of claim 28, wherein the base system logic comprise one or more virtual machines or containers.

39. The method of claim 38, wherein the base system logic comprises a hypervisor or a docker base for controlling the one or more virtual machines or containers and wherein the hypervisor or the docker base is coupled to the network interface device.

40. The method of claim 28, wherein the security configuration comprises one or more instructions to the network interface device.

41. The method of claim 40, wherein the one or more instructions comprise an instruction to direct the network interface device to perform an action selected from the one or more actions.

42. The method of claim 28, wherein the report message is analyzed to generate one or more control instructions to the network interface device.

43. The method of claim 42, wherein the one or more control instructions comprise an instruction to activate or deactivate the network interface device, and wherein the control instruction is generated based on the security state of the base system logic provided by the report message.

44. The method of claim 42, wherein the one or more control instructions comprise an instruction to suspend network traffic associated with the detected security threat, and wherein the control instruction is generated based on address identified from the detected security threat.

45. The method of claim 42, wherein the one or more control instructions comprise an instruction to redirect network traffic associated with the detected security threat to the destination address and destination port based on the predetermined deception based technology, and wherein control instruction is generated according to the detected security threat and the security configuration provided by the report message.

46. The method of claim 42, wherein the one or more control instructions comprise an instruction to send a beacon message to the network informing the security state of the base system logic and wherein the control instruction is generated when the security state of the base system logic is determined to be below a predetermined threshold.

47. The method of claim 46, wherein the threshold is determined by the network interface device.

48. The method of claim 46, wherein the threshold is determined by the EPP.

49. A computing system comprising: an end-point-protection platform (EPP) and a network interface device;
- the EPP hosted on a base system logic of the computing system and in communication with the network interface device; the EPP configured to:
  - a) detect a security threat;
  - b) generate a report message comprising information about a detected security threat, a security state of a base system logic, or a security configuration; and
  - c) transmit the report message to the network interface device;
- the network interface device a smart network interface device comprising: a memory for storing a first set of instructions and one or more processors configured to execute the first set of instructions to:
  - a) receive the report message from the EPP;
  - b) perform, in response to the report message, one or more of:
    - i) suspending network traffic associated with the detected security threat, isolating the base system logic from the network;
    - ii) redirecting a network traffic associated with the detected threat to a destination address and destination port based on a predetermined deception based technology;
    - iii) sending a beacon message to the network related to the security state of the base system logic;
    - iv) preventing base system communication with an internet host; and
    - v) suspending an application, a user, or a service.

* * * * *

UNITED STATES PATENT AND TRADEMARK OFFICE
CERTIFICATE OF CORRECTION

PATENT NO. : 10,944,720 B2
APPLICATION NO. : 16/641489
DATED : March 9, 2021
INVENTOR(S) : Predrag Zivic Page 1 of 1

It is certified that error appears in the above-identified patent and that said Letters Patent is hereby corrected as shown below:

In the Claims

In Claim 14, Column 10, Line 51, please delete the word "comprise" and replace it with --comprises--

In Claim 22, Column 11, Line 18, please delete the term "on address" and replace it with --on an address--

In Claim 27, Column 11, Line 50, please delete the term "wherein the one or more actions comprising" and replace it with --wherein the one or more actions comprise--

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*